L. SCHMIDT.
MACHINE FOR MAKING WIRED CORRUGATED BOARD.
APPLICATION FILED JULY 6, 1912.
1,159,716.
Patented Nov. 9, 1915.
5 SHEETS—SHEET 1.
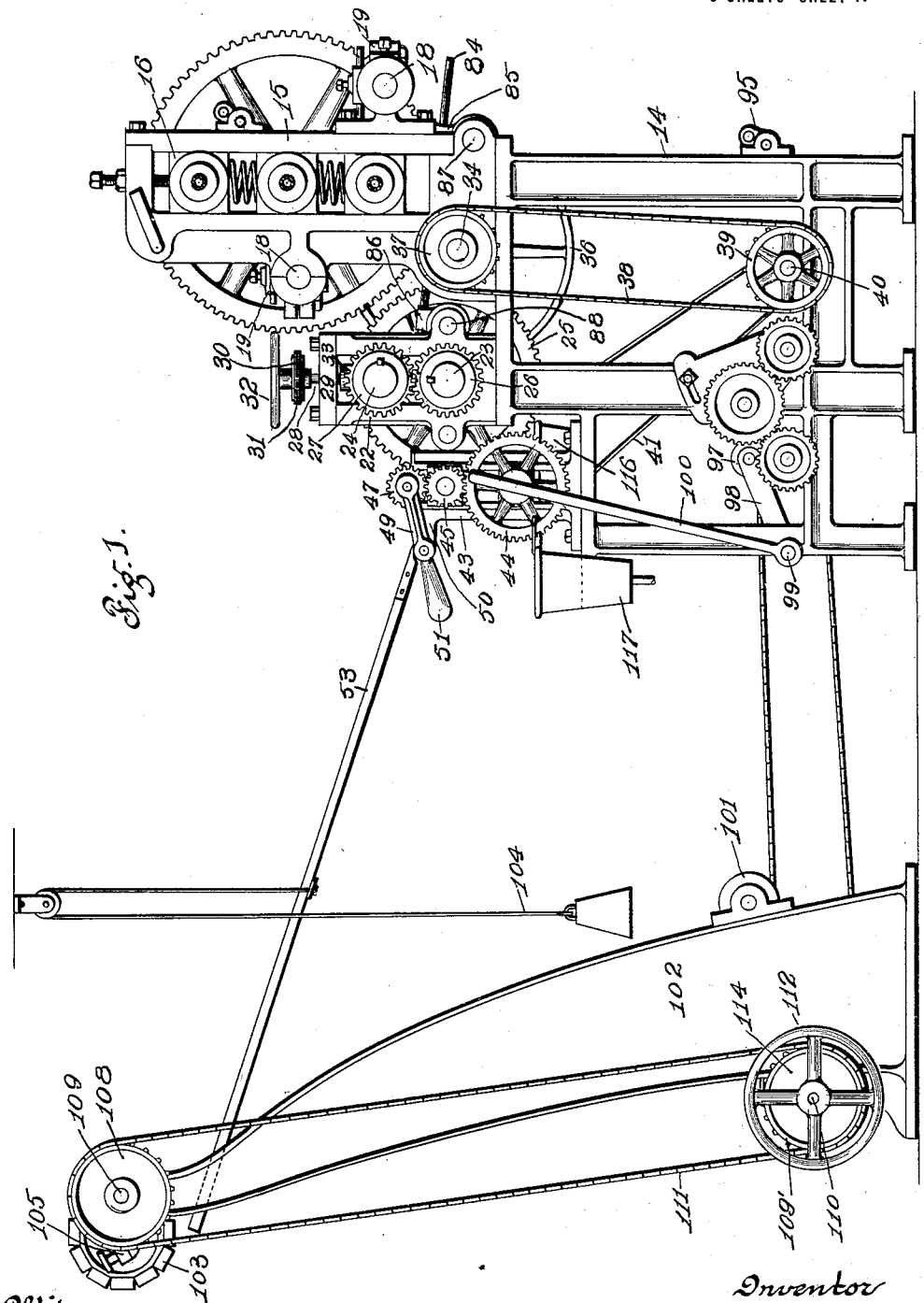

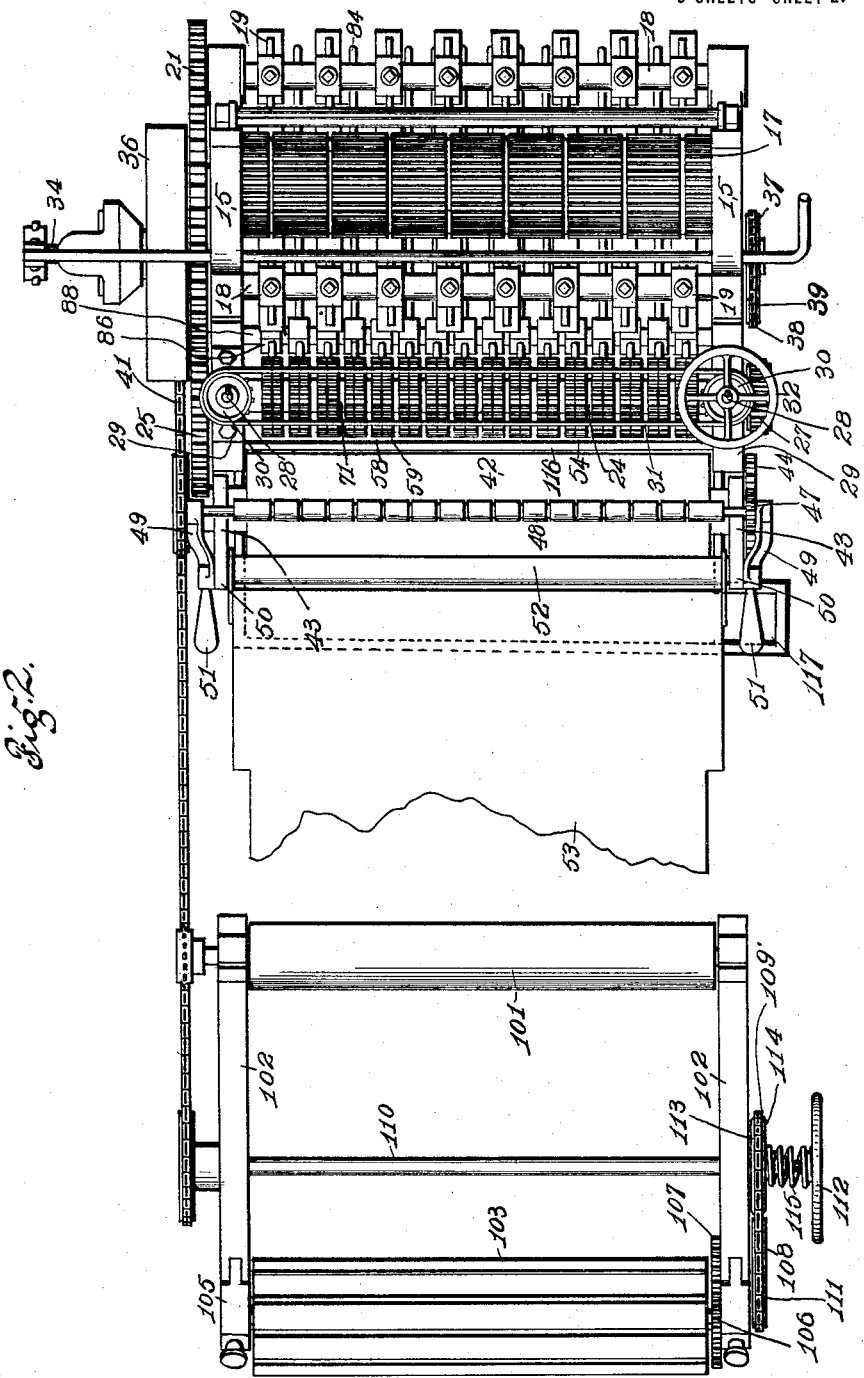

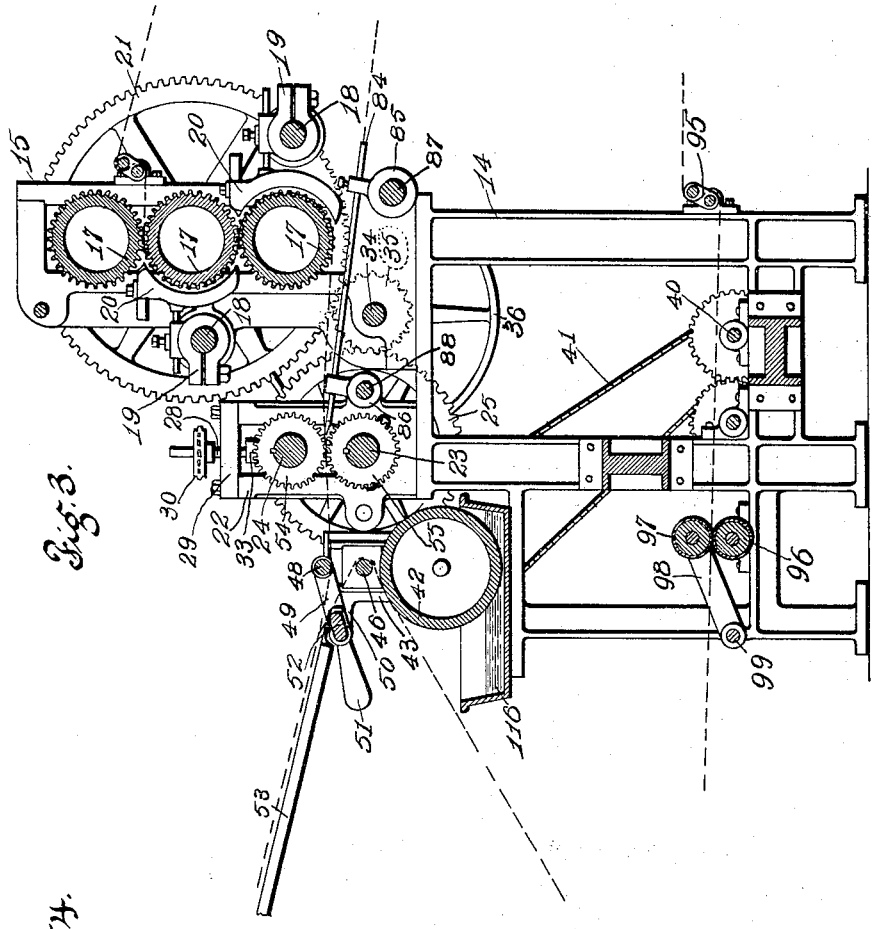
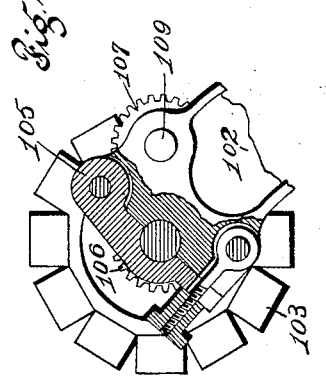
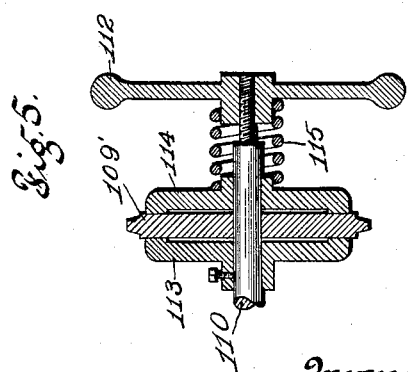

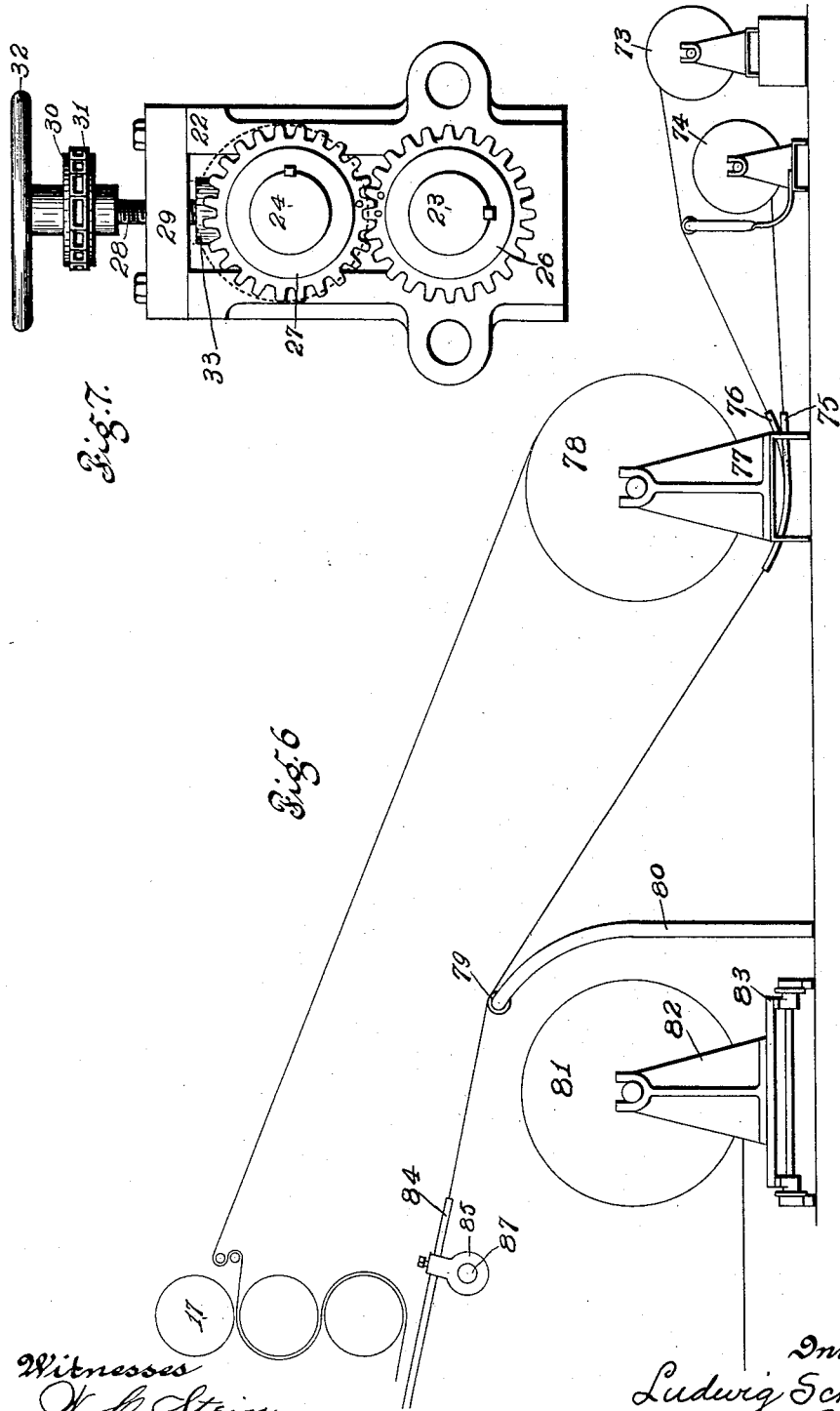

L. SCHMIDT.
MACHINE FOR MAKING WIRED CORRUGATED BOARD.
APPLICATION FILED JULY 6, 1912.
1,159,716.
Patented Nov. 9, 1915.
5 SHEETS—SHEET 5.
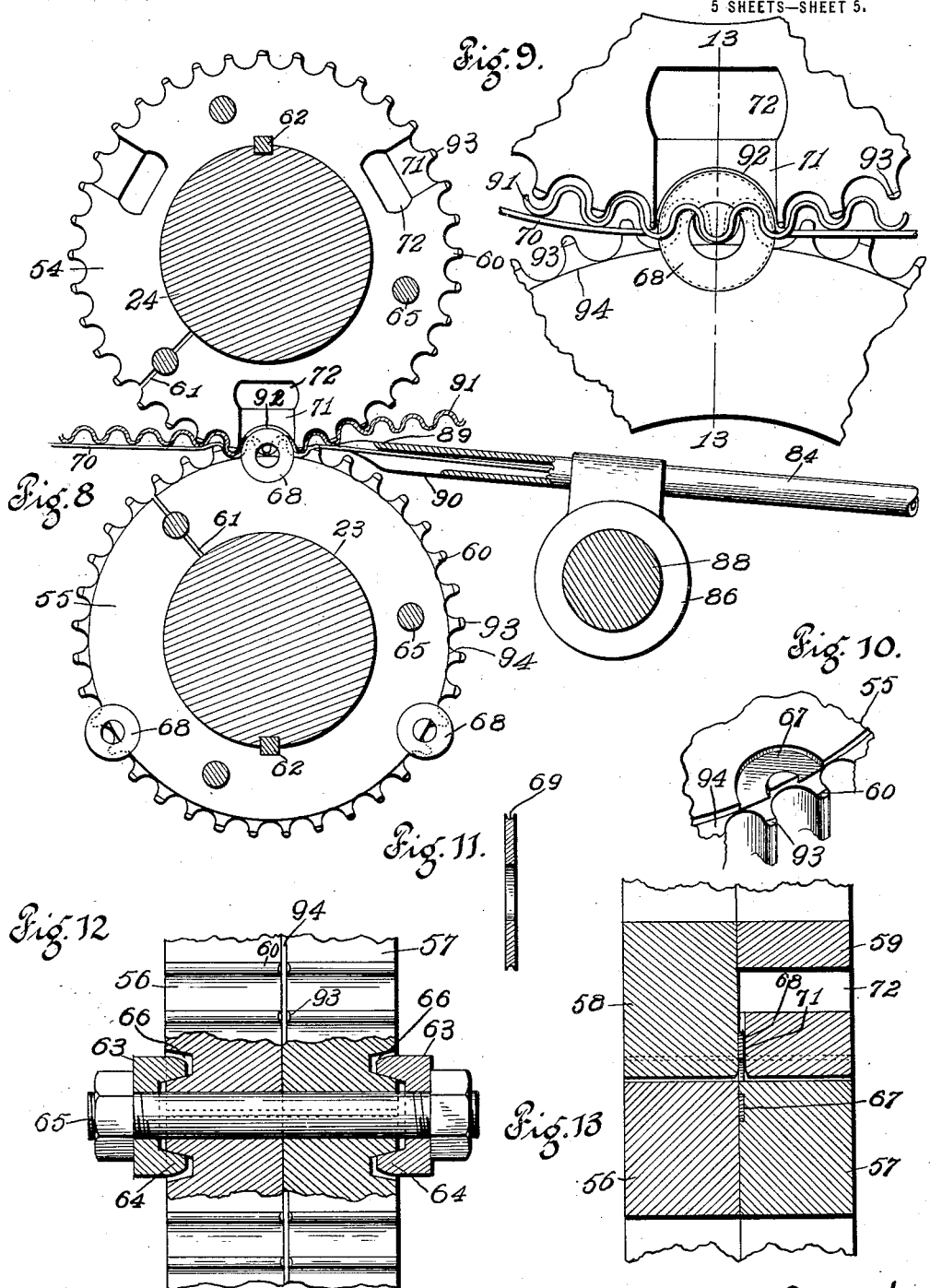

UNITED STATES PATENT OFFICE.

LUDWIG SCHMIDT, OF ST. LOUIS, MISSOURI, ASSIGNOR TO E. W. GROVE, SR.

MACHINE FOR MAKING WIRED CORRUGATED BOARD.

1,159,716.  Specification of Letters Patent. Patented Nov. 9, 1915.

Application filed July 6, 1912. Serial No. 708,054.

*To all whom it may concern:*

Be it known that I, LUDWIG SCHMIDT, a citizen of the United States, and resident of St. Louis, Missouri, have invented certain new and useful Improvements in Machines for Making Wired Corrugated Board, of which the following is a specification.

This invention relates to improvements in a machine for making wired corrugated board and has for its object a plurality of corrugating rolls by which the paper is corrugated, a means for feeding the corrugated paper simultaneously with a plurality of strands of wire between dies for forming loops into the wire at suitable intervals, the loops projecting through the board, and a means for placing a backing over the board and wires.

A further object is to construct a machine for forming corrugated board attaching a plurality of looped wires through the same and to provide the same with a backing all of which is done by a continuous process.

The essential feature of my invention is to construct a machine having a plurality of dies located at intervals apart through which wires are passed and loops formed on the wires at intervals apart, the said loops simultaneously with the forming thereof being projected through a sheet of corrugated material, and a means for placing the backing so that the wires are held firmly between the two layers of material.

Figure 1 is a side elevation of the machine involving my invention. Fig. 2 is a top plan view of the same. Fig. 3 is a vertical sectional view with the winding mechanism removed. Fig. 4 is a detail side elevation of the winding drum on which the finished material is supported showing the hinged bearing in section. Fig. 5 is a detail sectional view of the friction mechanism made use of for operating the winding drum. Fig. 6 is a side view in diagrammatic form showing the position of the board and wire supplying rolls and spools. Fig. 7 is an enlarged detail side elevation of the gear mechanism and bearing made use of for operating and supporting the rotating dies. Fig. 8 is an enlarged detail sectional view of the die supporting shafts with the dies located thereon and in operative communication. Fig. 9 is an enlarged fragmental view and side elevation showing the loop forming members of the dies and the position the loop assumes relative with the corrugated board. Fig. 10 is a fragmental perspective view of a portion of the die showing the recess in which the loop forming member is seated. Fig. 11 is a detail sectional view of the loop forming member. Fig. 12 is a plan view of a pair of members constituting a die, a portion broken away and in section showing the clamping means for retaining the same together. Fig. 13 is a cross-sectional view taken on the line 13—13 of Fig. 9.

The invention which is illustrated in the drawings consists of a suitable frame 14 which is provided with roller supporting frames 15; in these frames are slidably mounted journal bearings 16 which support hollow corrugating rollers 17; these hollow rolls are heated by steam, gas or otherwise and connections to the rolls for supplying the heat is of a structure well known to the mechanical art. On the frames 15 are supported shafts 18 on which are mounted a plurality of clamps 19, which support shoes 20 acting as guides for the material as it passes between the corrugating rollers; the corrugating rolls are driven by the large gear wheel 21 connected to a shaft or trunnion projecting from the center roll, and motion to the communicating rolls is imparted by the communication of the teeth or corrugations formed on the periphery of each roll.

On the frame 14 and in advance of the frames 15 are journal frames 22 in which are slidably mounted journal boxes supporting shafts 23 and 24. On the projecting end of the shaft 23 is a gear wheel 25, the opposite end provided with a pinion 26; this pinion meshing with a companion pinion 27 mounted on the shaft 24, and by this connection, the shafts 23 and 24 are placed in opposite rotation. The journal boxes which support the shaft 24 are secured to vertical screws 28 which operate in threaded bores formed in the upper cross-bars 29 of the frame and on the screws are sprocket wheels 30 over which is a sprocket chain 31. One of the screws is provided with a hand wheel 32 for operating the screws and when manipulated both screws are simultaneously rotated by means of the sprocket chain for raising and lowering the upper shaft 24, together with the plurality of dies carried thereby, the construction of which will be fully hereinafter described.

On the journal box operated by the screws is located a collar 33 which limits the upward movement and which prevents the gear sprockets 26 and 27 from becoming disengaged so that the position of the dies carried on both shafts are at all times intact.

In the frame is located a shaft 34 which is provided with a gear pinion 35 meshing with the gear wheels 21 and 25 and by which the same is placed in rotation, and on this same shaft is located a pulley 36 by which the entire mechanism is driven from any suitable source of motive power. The opposite end of the shaft 34 is provided with a sprocket wheel 37 over which a sprocket chain 38 operates, the said chain operating over a sprocket wheel 39 mounted on a shaft 40 supported in suitable journals located in the bottom of the frame 14; on this shaft is located a second sprocket wheel over which a sprocket chain 41 operates and imparts motion to the glue applying roller 42 supported in journals located in the frame 43. On one end of the gluing roller 42 is located a gear wheel 44 meshing with a pinion 45 operating a shaft or roller 46 and this pinion is in mesh with a pinion 47 which places in rotation a roller 48 supported between arms 49 pivoted to a bracket 50 on the frame 43, and the said roller 48 is raised and lowered by means of the handle 51. The arms 49 are connected together by a rounded cross bar 52 which acts as a guide for the passage of the material which forms the backing of the product as it enters on the automatically adjustable guide table 53.

On the shafts 23 and 24 and located at suitable intervals apart are the dies 54 and 55, by which the loops on the wires are formed; the construction of the mechanism which will be described in detail is clearly illustrated in Figs. 8 and 9; the dies 54 and 55 are arranged in pairs 56 and 57 and 58 and 59; the periphery is provided with corrugations or teeth 60 which correspond with the corrugations formed in the material by the corrugating rollers; each is separated or split as indicated by the numeral 61 so that each section of the die can be readily placed in position on the shaft and by means of the clamping device as shown in Fig. 12 the dies are firmly clamped upon the shafts in addition to the key 62 which will prevent the die from turning upon the shaft.

The clamping device consists of blocks 63 having tapered prongs 64 held in position by bolts 65; the tapered prongs seated in tapered recesses 66 formed in the sides of the die members, and by tightening upon the nuts of the bolts the blocks are drawn inwardly partly closing the slit indicated by the numeral 61 thoroughly clamping each member upon the shaft.

The dies 55 mounted upon the shaft 23 are provided with recesses 67 in which are seated loop forming members 68; these are held in position between the members 56 and 57 constituting the die assuming a position as shown and the periphery of the loop forming member is grooved as indicated by the numeral 69 and of sufficient size to accommodate the seating of the wire 70; the die 54 is provided with recesses 71 which are so positioned as to properly communicate with the loop forming member during the rotation of the dies, and the section 59 is provided with recesses 72 through which the material removed from the board by the puncturing of the same during the formation of the loop is permitted to pass out so as not to hinder the progress of operation.

The dies as described are mounted at suitable intervals apart on the shafts 23 and 24 and correspond with the number of strands of wire passing through the machine. The wires which are fed into the machine are arranged on spools 73 and 74 and are passed through guide tubes 75 and 76 located in the supporting frame 77 on which a roll of board 78 is mounted and which is fed over the corrugating rollers. The wires are supported on a roller 79 supported in a frame 80, which guides the wires over a roll of backing material 81 which is mounted on a frame 82 and supported on a truck 83; the wires are fed through a plurality of tubes 84 mounted in supports 85 and 86, these supports held on cross rods or bars 87 and 88; these tubes correspond in number with the dies, the ends 89 of said tubes being suitably flattened, pointed and split as indicated by the numeral 90 and is in proper alinement with the loop forming members and during the rotation of the dies these loop forming members pass through the slotted end of the tubes and contact with the wires, the wires of course resting in the grooves 69; the corrugated board 91 is simultaneously fed from the corrugating rollers between the plurality of dies assuming the position as shown in Figs. 8 and 9 and when the loop forming members communicate with the recesses 71 the wires are formed into loops 92, and during the formation the corrugated board or material is simultaneously slit by the pressure of the wire and loop forming member, the corrugated board being held in position by the corrugations or teeth 60 on the dies; the looped wire together with the corrugated material is advanced forwardly passing over the roller 48 where at this point the same communicate with the backing material, its surface having been properly coated with glue by the roller 42, and adheres firmly to the under side of the corrugated board firmly retaining the looped wires in proper position between the same.

The edges of the corrugations of the corrugating surface of the dies are suitably flared as indicated by the numeral 93 and one side recessed as indicated by the numeral 94 so as to provide for the reception of the wire during its passage through the die without marring or bending the same other than forming the loop previously described.

From the roll 81 is fed the backing material, the same passing around the two rollers 95 supported on the frame 14 (see Fig. 3) the material then passes between the roller 96 and the roller 97, which roller is supported on a frame 98 pivoted at the point indicated by the numeral 99 to the forepart of the frame, and this roller is manipulated by bringing the same in and out of contact with the roller 96 and the material between the same by means of the lever 100; the material then passes around a roller 101 mounted on standards 102 on the upper end of which is supported a winding drum 103. The material from the roll 101 passes up around the roller 46 and over the rounded cross bar 52 and after adhering to the corrugated board and wire, rests upon the automatic adjustable guide table 53, which is supported on the rounded cross bar 52 and held in proper elevation corresponding with the increased diameter of the winding drum as the material is wound thereon by the counter-balance rope and weight 104.

The winding drum over which the finished product is mounted has pivotal support in a hinged bearing 105 and is placed in rotation by the meshing gears 106 and 107, the gear 107 operated by a sprocket wheel 108 mounted on a short shaft 109' which also supports the gear 107, and communicating with the sprocket wheel 108 and a sprocket wheel 109' supported to a shaft 110, which has bearing on the standard 102, is a sprocket chain 111.

On the shaft 110 is mounted a hand wheel 112 and a frictional mechanism consisting of a tight collar 113 and a loose collar 114; these collars are arranged on each side of the sprocket wheel 109' and frictional contact is imparted to the sprocket wheel by the pressure of the spring 115 which is located between the collar 114 and the hand wheel 112; the object of this mechanism is to hold the sprocket wheel 109' in frictional contact and yet permit sufficient slippage during the operation of the winding of the finished product upon the drum and regulate its movement with the manipulation of the drum as the same increases in size as the finished product is being wound thereon, because in this manner the rotation of the drum is at all times regular.

On the fore part of the frame 14 is mounted a glue receptacle 116 in which glue is placed in order to supply the gluing roller 42 with sufficient glue to be applied to the backing material as the same contact; the one end of the glue receptacle has a tapered extension 117 from which the glue in the receptacle can be drained when so desired.

The product which is constructed by my machine is of a width aggregating from thirty-six to sixty inches and the wires arranged at approximately from four to six inches apart; the dies on the shafts which form the loops in the wires are so arranged as to place the loops on each adjacent wire in staggered position so that each loop on each alternate wire is approximately in alinement and in order to prevent the loops from becoming bent over or mashed down while the finished product is being wound upon the drum I may, if desired construct a convenient drum. By this method the loops are held intact and the material after having been wound upon the drum is held thereon until the same has become thoroughly dried, when it is removed and the felt strips rewound upon the drum ready for a repeated action; the drum together with the finished product is removed from the standards 102 and a new drum placed in position within the hinged bearings 105.

The essential feature of my invention is the construction and arrangement of the dies which are mounted on the shafts 23 and 24 which permits the corrugated material to pass between the dies un-obstructed and un-injured with the exception of removing a portion of the material during the formation of the loops.

The operation of my invention is as follows: The material to be corrugated is fed from the roll 78 between and over the corrugating rollers and from the bottom corrugated roller the corrugated material is led between the plurality of dies on the shafts 23 and 24. Simultaneously with the movement of the corrugated material a plurality of wires are fed to the dies from the spools 73 and 74 and guided through the tubes 84. During the rotation of the dies three loops in the wires are formed by each revolution of the dies and during the forming of the loops the corrugated material is punctured permitting the loops to project through the same while the remaining or straight portion of the wires closely contact with the under side of the corrugated material. As the looped wires together with the corrugated material pass through the dies a backing is applied to the under side which is fed from a roll 81 between rollers 95, 96 and 97 over a roller 101 contacting with a glue applying roller 42 over a roller 46 and then brought in contact with the under surface of the corruated material and the wires and is permitted to contact with the automatic adjusting guide table while the finished product is being wound upon the drum 103, and as the drum increases in size during the winding up of the material the table descends gradually, holding the glue applied backing in contact with the corrugated material and wires so that the same will properly adhere thereto and when the drum has been supplied with sufficient length of the finished product the material is severed and the drum removed from its position and a new drum replaced.

The machine is placed in and out of operation by means of an ordinary clutch mechanism which controls the driving shaft.

Having fully described my invention what I claim is:

1. A machine of the class described comprising a frame, rotating dies mounted thereon, corrugating rollers mounted on said frame by which a sheet of material is corrugated, means for guiding a plurality of wires into the rotating dies, means carried by the dies for forming loops in the wires at suitable intervals apart and to simultaneously project the loops through the corrugated sheet passing through the dies simultaneously with the wires, means for feeding a covering in contact with the corrugated material and wires, and means for applying a coating of adhesive to the contacting surface of the covering and a drum for winding up the finished material.

2. A machine of the class described comprising a frame, corrugating rollers mounted thereon, means for rotating the same, a plurality of rotating dies mounted on the frame for receiving the corrugated material, guide tubes corresponding in number with the dies carried by the frame and through which wires are fed to the dies, loop forming members carried by one section of the dies communicating with recesses in the communicating section for looping the wires at intervals and penetrating the same through the corrugated material, means for rotating the dies simultaneously with the corrugating rollers, and means for feeding a coated backing material to be brought in communication with the corrugated material and wires.

3. A machine for making wired corrugated board comprising corrugating rollers, rotating dies having corrugations corresponding with the corrugations in the material, guide tubes supported in the machine and located in close proximity to the dies for feeding wires into the dies simultaneously with the feeding of the corrugated material, loop forming members forming part of the dies by which the wires are looped at proper intervals and simultaneously projected through the corrugated material, and means for feeding a backing material to communicate with the corrugated material and looped wires.

4. A machine of the class described comprising a mechanism by which a sheet of material, and a plurality of wires are handled simultaneously, the wires being looped at intervals and said loops projected through the material and a means for applying a backing for retaining the wires in position.

In testimony whereof, I have signed my name to this specification, in presence of two subscribing witnesses.

LUDWIG SCHMIDT.

Witnesses:
ALFRED A. EICKS,
WALTER C. STEIN.

Copies of this patent may be obtained for five cents each, by addressing the "Commissioner of Patents, Washington, D. C."